(12) United States Patent  (10) Patent No.: US 8,847,743 B2
Ishikawa et al.  (45) Date of Patent: Sep. 30, 2014

(54) DISPLAY APPARATUS FOR VEHICLE

(71) Applicant: Denso Corporation, Kariya (JP)

(72) Inventors: Toshiki Ishikawa, Ichinomiya (JP); Naoyuki Aoki, Kariya (JP)

(73) Assignee: Denso Corporation, Kariya (JP)

( * ) Notice: Subject to any disclaimer, the term of this patent is extended or adjusted under 35 U.S.C. 154(b) by 70 days.

(21) Appl. No.: 13/677,742

(22) Filed: Nov. 15, 2012

(65) Prior Publication Data

US 2013/0127608 A1  May 23, 2013

(30) Foreign Application Priority Data

Nov. 21, 2011 (JP) ................................ 2011-253977

(51) Int. Cl.
*B60Q 1/00* (2006.01)
*H04N 13/02* (2006.01)
*H04N 13/04* (2006.01)
*B60K 35/00* (2006.01)
*H04N 13/00* (2006.01)
*B60K 37/02* (2006.01)

(52) U.S. Cl.
CPC .............. *B60Q 1/00* (2013.01); *H04N 13/0207* (2013.01); *H04N 13/0497* (2013.01); *B60K 2350/352* (2013.01); *B60K 2350/2013* (2013.01); *H04N 13/0404* (2013.01); *B60K 35/00* (2013.01); *H04N 13/0484* (2013.01); *H04N 13/00* (2013.01); *B60K 2350/2017* (2013.01); *B60K 37/02* (2013.01); *B60K 2350/1072* (2013.01)
USPC ..................................................... 340/425.5

(58) Field of Classification Search
USPC ............ 340/425.5, 426.15, 438, 461; 348/42, 348/51
See application file for complete search history.

(56) References Cited

U.S. PATENT DOCUMENTS

| 2009/0116732 | A1* | 5/2009 | Zhou et al. | 382/154 |
| 2011/0102556 | A1* | 5/2011 | Kim et al. | 348/51 |
| 2013/0120362 | A1* | 5/2013 | Harris et al. | 345/419 |
| 2013/0201303 | A1* | 8/2013 | Shimotani et al. | 348/51 |

FOREIGN PATENT DOCUMENTS

| JP | 2001-021836 | | 1/2001 |
| JP | 2004-328566 | * | 11/2004 |
| JP | 2005-067515 | | 3/2005 |
| JP | 2005067515 | * | 3/2005 |
| JP | 2007-065316 | | 3/2007 |
| JP | 2013-104976 | | 5/2013 |

OTHER PUBLICATIONS

Office action dated Sep. 24, 2013 in corresponding JP Application No. 2011-253977.

* cited by examiner

*Primary Examiner* — Phung Nguyen
(74) *Attorney, Agent, or Firm* — Harness, Dickey & Pierce, PLC

(57) ABSTRACT

A vehicle display apparatus includes a display section, an estimation section, and a controller. The display section has a screen and displays an image on the screen so that a user views a design in the image at a position away from the screen by a predetermined distance in a direction perpendicular to the screen. The estimation section estimates whether a movement of a line of sight of the user to the screen from a region outside the screen occurs. The controller gradually increases the distance, when the estimation section estimates that the movement occurs.

12 Claims, 11 Drawing Sheets

DISPLAY APPARATUS FOR VEHICLE

CROSS REFERENCE TO RELATED APPLICATION

This application is based on Japanese Patent Application No. 2011-253977 filed on Nov. 21, 2011, the disclosure of which is incorporated herein by reference.

FIELD

The present disclosure relates to a display apparatus mounted on a vehicle and configured to display an image related to the vehicle in such a manner that a user can view a design in the image in three dimensions.

BACKGROUND

As described in, for example, JP-A-2007-65316, JP-A-2001-21836, and JP-A-2005-67515, a vehicle display apparatus for displaying a design in an image related to the vehicle, such as a warning image or an arrow image used for navigation, in three dimensions is known. A liquid crystal display (LCD) of the conventional vehicle display apparatus employs a disparity segmentation method to allow a user to view the design in three dimensions. Specifically, the image is formed as a combination of a left image and a right image, and the LCD displays both the left image and the right image on its screen. The left image is visible by a left eye of the user, and the right image is visible by a right eye of the user. Due to a disparity between the left and right images, the user views the design in three dimensions at a position away from the screen by a predetermined distance in a direction perpendicular to the screen.

In the conventional vehicle display apparatus, when the user views the design in three dimensions, the focus of the eyes of the user is on the screen. In contrast, the position at which the user views the design is away from the screen. Therefore, the user may recognize the left image and the right image as separate images. As a result, the user may not view the design in three dimensions.

In the vehicle display apparatus disclosed in JP-A-2005-67515, when it is detected that the user sits on a seat of the vehicle, a three dimensional image is displayed for demonstration before the image related to the vehicle is displayed. The demonstration image may help the user to be acclimated to a three dimensional image.

However, a distance of the demonstration image from the screen is fixed. Therefore, immediately after the user looks at the demonstration image, the user may recognize a left image and a right image of the demonstration image as separate images.

SUMMARY

In view of the above, it is an object of the present disclosure to provide a display apparatus mounted on a vehicle and configured to display an image related to the vehicle in such a manner that a user can easily view a design in the image in three dimensions.

According to an aspect of the present disclosure, a display apparatus is adapted to be mounted on a vehicle and configured to display a series of images in such a manner that a user views a design in the series of images in three dimensions. Each of the series of images is formed as a combination of a left image visible by a left eye of the user and a right image visible by a right eye of the user. The display apparatus includes a display section, an estimation section, and a controller. The display section has a screen and displays the left image and the right image on the screen so that the user views the design at a position away from the screen by a predetermined imaginary distance in a direction perpendicular to the screen. The estimation section estimates whether a movement of a line of sight of the user to the screen from a region outside the screen occurs. The controller gradually increases the imaginary distance, when the estimation section estimates that the movement occurs.

BRIEF DESCRIPTION OF THE DRAWINGS

The above and other objects, features, and advantages will become more apparent from the following description and drawings in which like reference numerals depict like elements. In the drawings:

FIG. 6 is a diagram illustrating a relationship between an imaginary distance of a logo from the screen of the display apparatus of FIG. 1 and a time elapsed from when an ignition of the vehicle is turned ON;

DETAILED DESCRIPTION OF THE PREFERRED EMBODIMENTS

First Embodiment

A display apparatus 100 according to a first embodiment of the present disclosure is described below with reference to FIGS. 1-7. The display apparatus 100 is mounted inside a vehicle in such a manner that a screen 31 of a liquid crystal display (LCD) 30 faces toward a driver's seat. The display apparatus 100 displays an information image 50 on the screen 31.

Figure 2:
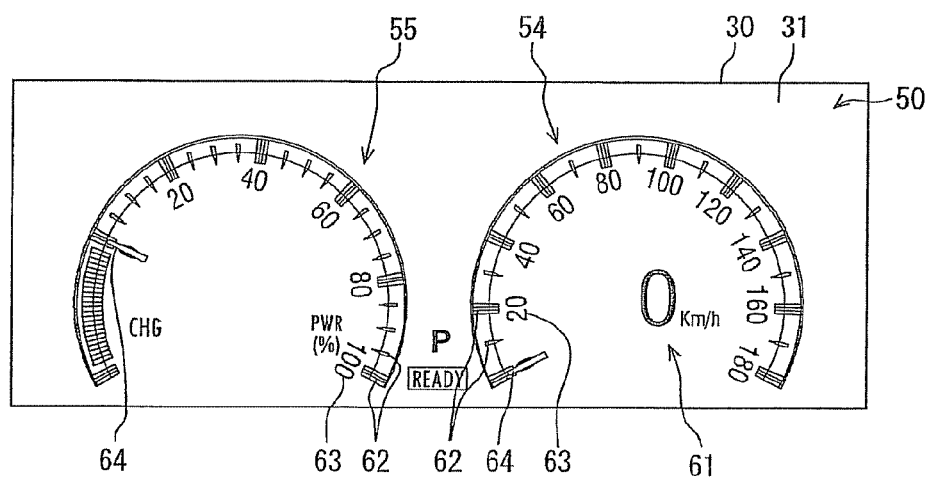
FIG. 2 is a diagram illustrating an information image displayed on a screen of the display apparatus of FIG. 1.

As shown in FIG. 2, the information image 50 includes a speed meter 54 and a power meter 55. The speed meter 54 indicates a present running speed of the vehicle as vehicle information related to the vehicle. The speed meter 54 is formed as a combination of designs of a digital indicator 61, a marking 62, a number 63, and a pointer needle 64. The power meter 55 indicates a present output power of an engine of the vehicle as the vehicle information. The power meter 55 is formed as a combination of designs of the marking 62, the number 63, and the pointer needle 64. For example, the engine can be an internal combustion engine, an electric motor, or a hybrid engine having both the internal combustion engine and the motor. According to the first embodiment, the vehicle is a hybrid electric vehicle, and the engine is the hybrid engine.

Figure 1:
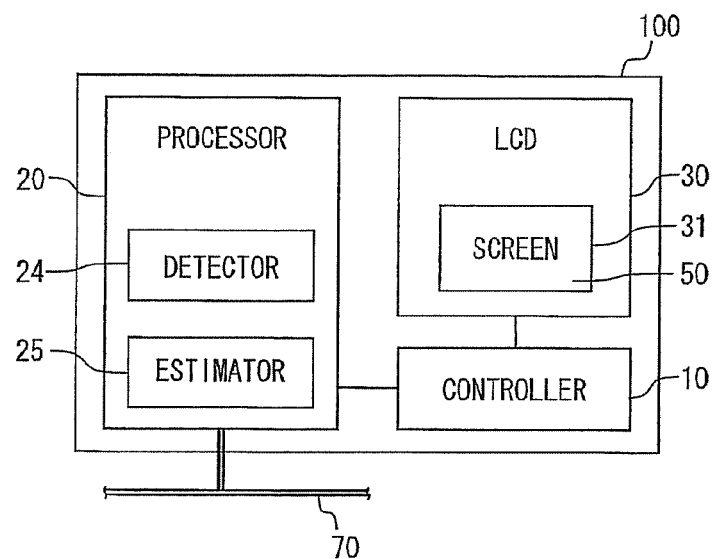
FIG. 1 is a block diagram illustrating a display apparatus according to a first embodiment of the present disclosure.
Figure 3:
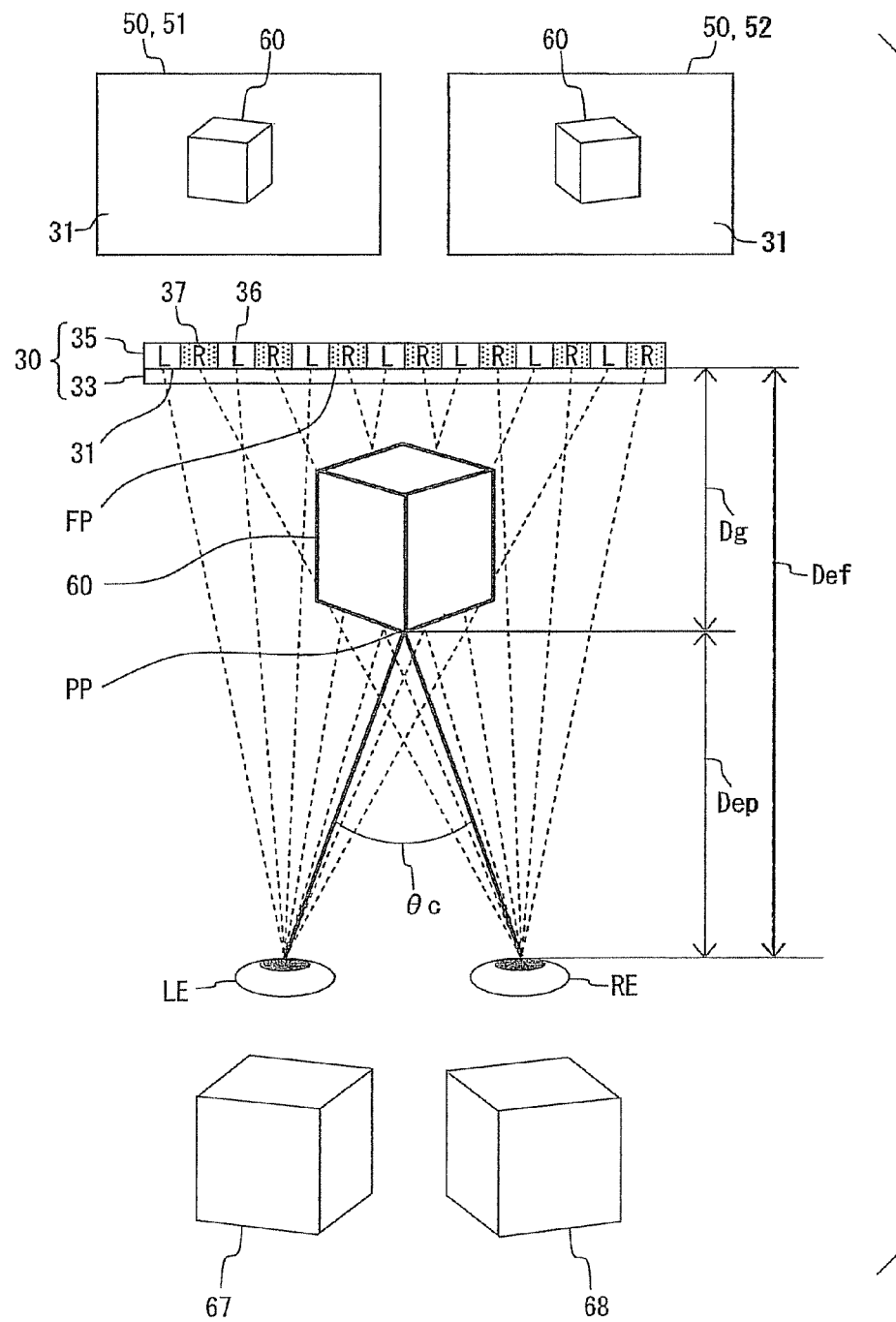
FIG. 3 is a diagram illustrating how a user views a design in the image in three dimensions with the naked eyes.

As shown in FIG. 1, the display apparatus 100 includes a LCD controller 10, a processor 20, and the LCD 30. The LCD 30 is connected to the controller 10 and displays the information image 50 on the screen 31 in such a manner that a user (e.g., driver) seated on the driver's seat can view the designs (i.e., the digital indicator 61, the marking 62, the number 63, and the pointer needle 64) shown in the information image 50 in three dimensions with naked eyes. As shown in FIG. 3, the LCD 30 includes a lenticular lens 33 and a liquid crystal panel 35.

The liquid crystal panel 35 has a lot of pixels that are arranged in vertical and horizontal directions of the screen 31 to display color images. The lenticular lens 33 is arranged along the liquid crystal panel 35. For example, the lenticular lens 33 can include cylindrical lenses that are arranged in the horizontal direction Of the screen 31. The lenticular lens 33 refracts light beams emitted from the pixels of the liquid crystal panel 35 in such a manner that the pixels which emit the light beams received by a left eye LE of the user are different from the pixels which emit the light beams received by a right eye RE of the user. Thus, the pixels of the liquid crystal panel 35 are divided into left pixels 36 visible almost only by the left eye LE and right pixels 37 visible almost only by the right eye RE.

Figure 4:
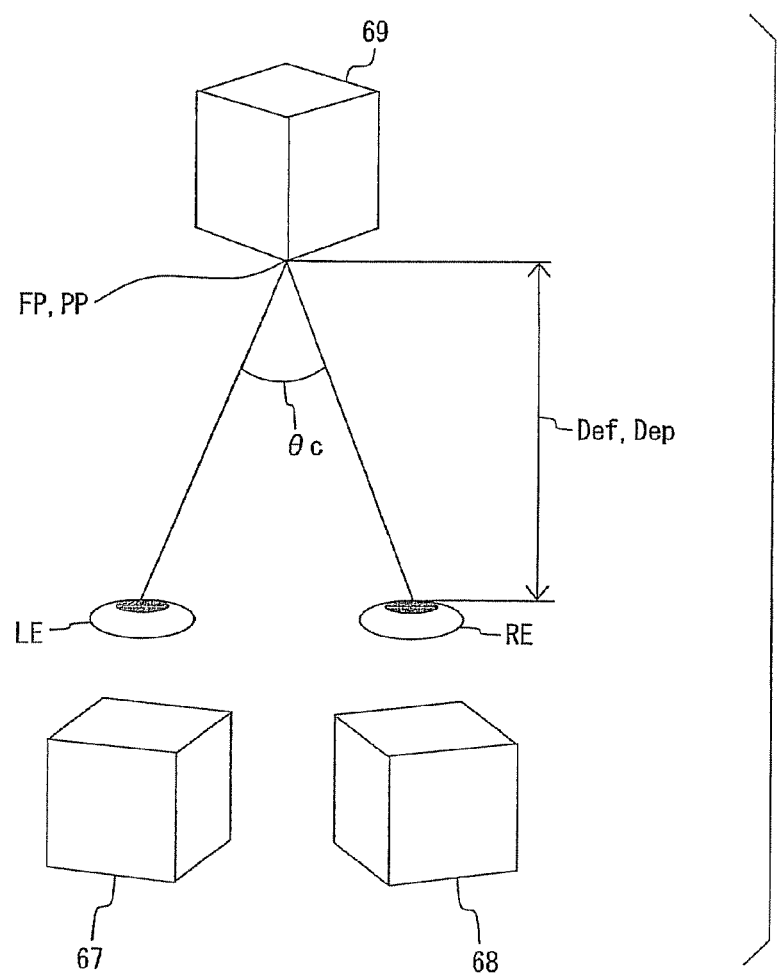
FIG. 4 is a diagram illustrating how a user views a real object in three dimensions.

Next, a principle on which the user can view a real target object 69 in three dimensions is described with reference to FIG. 4. The user views the real target object 69 with the left eye LE and the right eye RE from different directions. As a result, a difference occurs between an image 67 of the real target object 69 viewed with the left eye LE and an image 68 of the real target object 69 viewed with the right eye RE. This difference is generally referred to as the "binocular disparity". The binocular disparity allows the user to view the real target object 69 in three dimensions.

An angle $\theta_c$ formed by a line of sight from the left eye LE to the real target object 69 and a line of sight from the right eye RE to the real target object 69 is a convergence angle of the user. The user senses that the real target object 69 is located at a point PP of the intersection of the lines. The sensing point PP depends on the convergence angle $\theta_c$. Specifically, as the convergence angle $\theta_c$ becomes larger, the user feels closer to the sensing point PP, i.e., the real target object 69. Under a condition where the user views the real target object 69, the left eye LE and the right RE of the user are focused on the real target object 69. Therefore, when the user views the real target object 69 in three dimensions, a distance Def from the left eye LE and the right RE to a focusing point FP on which the left eye LE and the right RE are focused is substantially equal to a distance Dep from the left eye LE and the right RE to the sensing point PP.

Next, a principle on which the LCD 30 can allow the user to view a design 60 in the information image 50 in three dimensions with the naked eyes is described with reference to FIG. 3. For the simplicity's sake, the digital indicator 61, the marking 62, the number 63, and the pointer needle 64 in the information image 50 shown in FIG. 2 are collectively represented as the simple cubic design 60 in FIG. 3.

The left pixels 36 of the liquid crystal panel 35 display a left image 51 viewed by the left eye LE, and the right pixels 37 of the liquid crystal panel 35 display a right image 52 viewed by the right eye RE. The binocular disparity is reflected in the design 60 in each of the left image 51 and the right image 52. The LCD 30 causes the user to view the left image 51 with the left eye LE, while causing the user to view the right image 52 with the right eye RE. As a result, the user senses the binocular disparity between the image 67 of the design 60 viewed with the left eye LE and the image 68 of the design 60 viewed with the right eye RE. Thus, the user views a three dimensional (i.e., stereoscopic) image of the design 60 at the sensing position PP away from (i.e., distanced from) the screen 31 in a direction perpendicular to the screen 31. That is, the user views the design 60 in such a manner that the design 60 jumps out of the screen 31.

Further, the LCD 30 can adjust the sensing position PP with respect to the screen 31 by adjusting the binocular disparity reflected in the design 60 in each of the left image 51 and the right image 52. That is, the LCD 30 can adjust an imaginary distance Dg between the design 60 and the screen 31 by adjusting the binocular disparity. Further, the LCD 30 can allow the user to view the design 60 in two dimensions by causing the left pixels 36 and the right pixels 37 to display the same image (i.e., the left image 51 and the right image 52 are identical).

Although not shown in the drawing, the controller 10 includes a processing unit, a flash memory, and a graphic RAM. The processing unit performs drawing processing to draw the information image 50 based on information stored in the flash memory by using the graphic RAM as a working area. Further, the controller 10 includes an interface circuit for allowing the controller 10 to exchange information with the processor 20 and the LCD 30. The controller 10 draws the information image 50 based on information received from the processor 20. The controller 10 outputs image data of the drawn information image 50 to the LCD 30 so that the information image 50 can be displayed on the screen 31 of the LCD 30.

Although not shown in the drawing, the processor 20 includes a processing unit, a flash memory, and a RAM. The processing unit performs arithmetic processing based on programs stored in the flash memory by using the RAM as a working area. Further, the processor 20 includes an interface circuit for allowing the processor 20 to exchange information with the controller 10 and an in-vehicle LAN 70. The processor 20 receives the present running speed and the present output power as the vehicle information through the in-vehicle LAN 70.

The processor 20 performs predetermined programs, thereby functioning as a detector 24 and an estimator 25. The detector 24 detects a start signal out of a lot of information signals on the in-vehicle LAN 70. The start signal is a signal for starting up the engine of the vehicle. When the detector 24 detects the start signal, the estimator 25 outputs an opening image display signal to the controller 10. In response to the opening image display signal, the controller 10 causes the LCD 30 to display a series of opening images 56 on the screen 31. The opening images 56 are described below with reference to FIG. 5.

Figure 5:
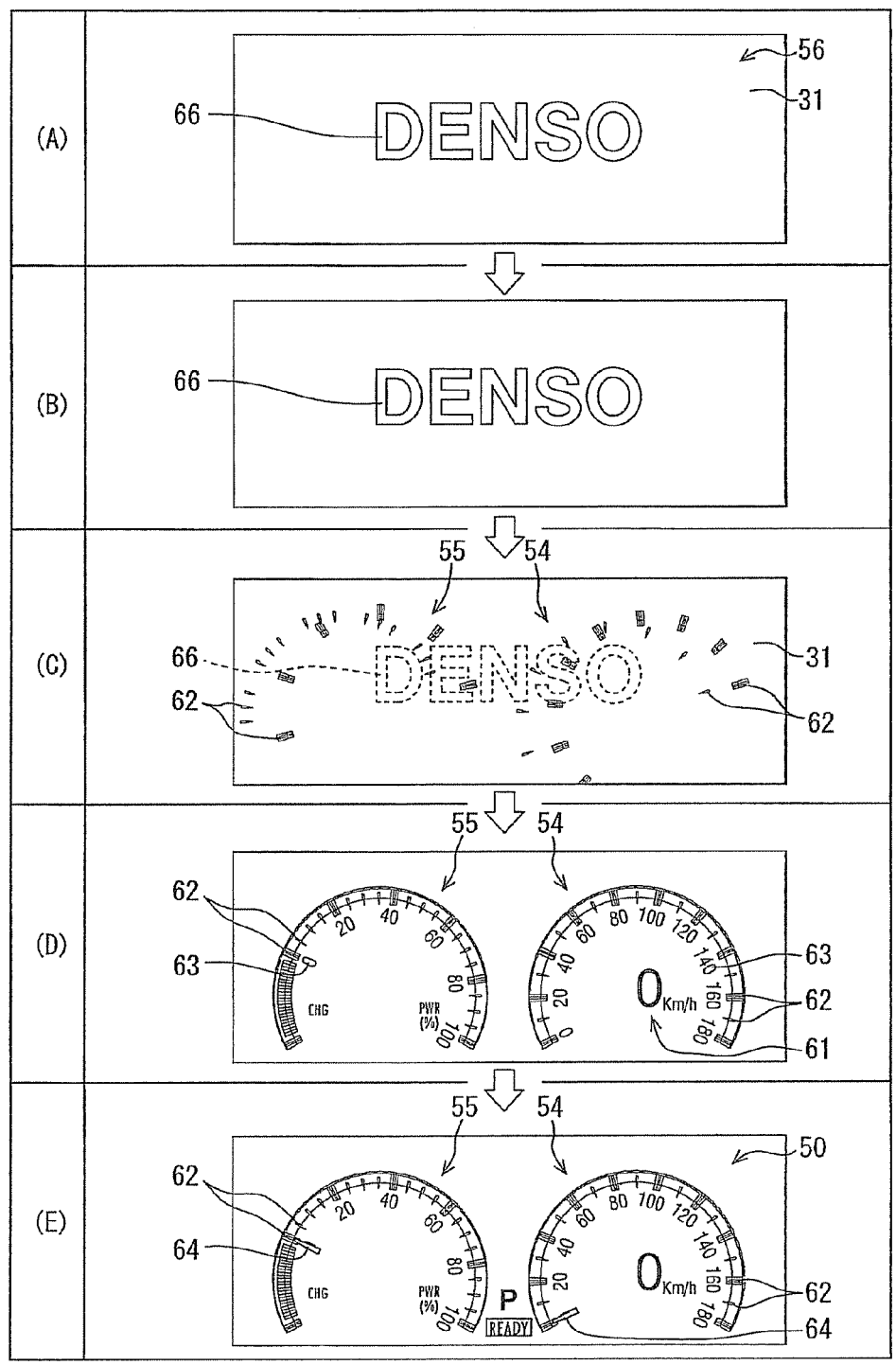
FIG. 5 is a diagram illustrating a change in an image displayed on the screen of the display apparatus of FIG. 1.
Figure 6:
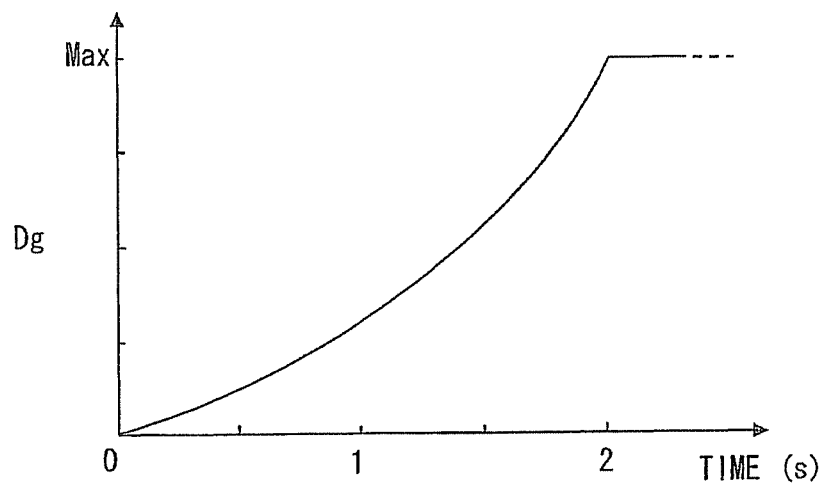

The opening image 56 changes with time in an alphabetical order (A), (B), (C) of FIG. 5. In (A) of FIG. 5, a logo 66 related to the vehicle is displayed as a design in the center of the screen 31. According to the first embodiment, the logo 66 indicates a maker of the display apparatus 100. In (A) of FIG. 5, an imaginary distance Dg of the logo 66 with respect to the screen 31 is zero so that the logo 66 can be displayed as a two dimensional image. The imaginary distance Dg of the logo 66 changes from zero to a predetermined maximum value (Max) within a predetermined period of time. For example, according to the first embodiment, as shown in FIG. 6, the imaginary distance Dg of the logo 66 can change from zero to the maximum value in two seconds. Further, a rate of the change in the imaginary distance Dg of the logo 66 can vary with time. For example, according to the first embodiment, as shown in FIG. 6, the rate of an increase in the imaginary distance Dg of the logo 66 can increase with time.

(B) of FIG. 5 shows a situation where the imaginary distance Dg of the logo 66 reaches the maximum value so that the logo 66 can be displayed as a three-dimensional image. Thus, the user can feel that the logo 66 jumps out of the screen 31. During a period of time the opening image 56 changes from (A) to (B) of FIG. 5, the user can feel that the logo 66 moves with acceleration toward the user.

The imaginary distance Dg of the logo 66 is kept at the maximum value for a predetermined period of time. Then, as shown in (C) of FIG. 5, the logo 66 gradually disappears (i.e., fades out) from the screen 31 while the imaginary distance Dg of the logo 66 gradually decreases. As the logo 66 fades out from the screen 31, the markings 62 of the meters 54 and 55 fade in on ah outer region of the screen 31 and move to predetermined positions on the screen 31.

Then, as shown in (D) of FIG. 5, when the markings 62 reach the respective positions on the screen 31, the digital indicator 61 and the numbers 63 of the meters 54 and 55 appear on the screen 31. In (D) of FIG. 5, an imaginary distance Dg of each marking 62 with respect to the screen 31 is about half an imaginary distance Dg of the digital indicator 61 with respect to the screen 31. Thus, the user views the digital indicator 61 and the markings 62 in three dimensions and can feel that the digital indicator 61 is located closer to the user than the markings 62.

Then, as shown in (E) of FIG. 5, the pointer needle 64 of the meters 54 and 55 pointing to positions corresponding to the current vehicle information appear on the screen 31 so that the information image 50 including the meters 54 and 55 can be displayed on the screen 31. An imaginary distance Dg of each pointer needle 64 with respect to the screen 31 is slightly greater than the imaginary distance Dg of the marking 62 so that the user can feel that the pointer needle 64 is located closer to the user than the marking 62.

As described above, the series of the opening images 56 is displayed when the user gets into the vehicle and performs a startup operation to start the engine. Generally, there is a high probability that the user's line of sight moves from a region outside the screen 31 to the screen 31 after the user performs the startup operation. Based on whether the detector 24 detects the start signal, the estimator 25 indirectly estimates whether the user's line of sight moves to the screen 31 after being kept at the region outside the screen 31 for a predetermined period of time. When the estimator 25 estimates that the user's line of sight is on the screen 31, the estimator 25 outputs the opening image display signal to the controller 10 so that the series of opening images 56 can be displayed on the screen 31. Thus, it is likely that the user will look at the series of opening images 56 and continue to view the logo 66 whose imaginary distance Dg gradually increases.

Figure 7:
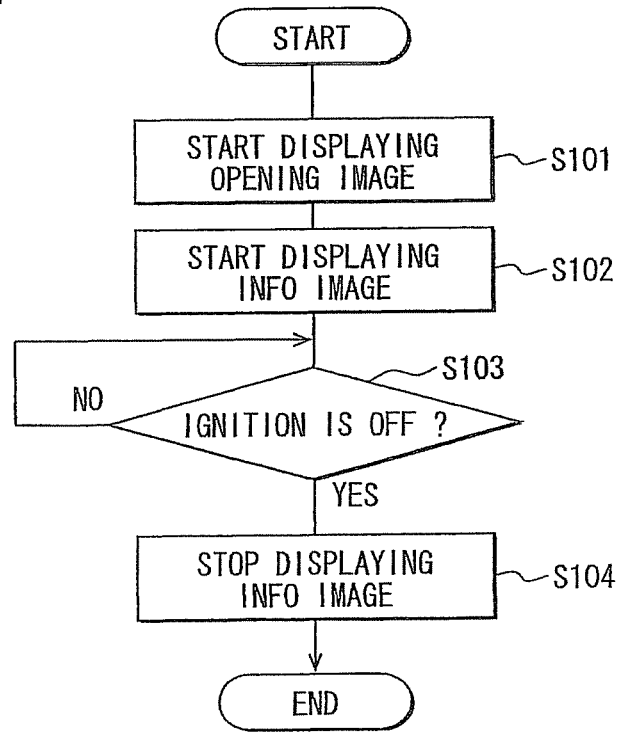
FIG. 7 is a diagram illustrating a flow chart of a display process performed by a processor of the display apparatus of FIG. 1.
Figure 8:
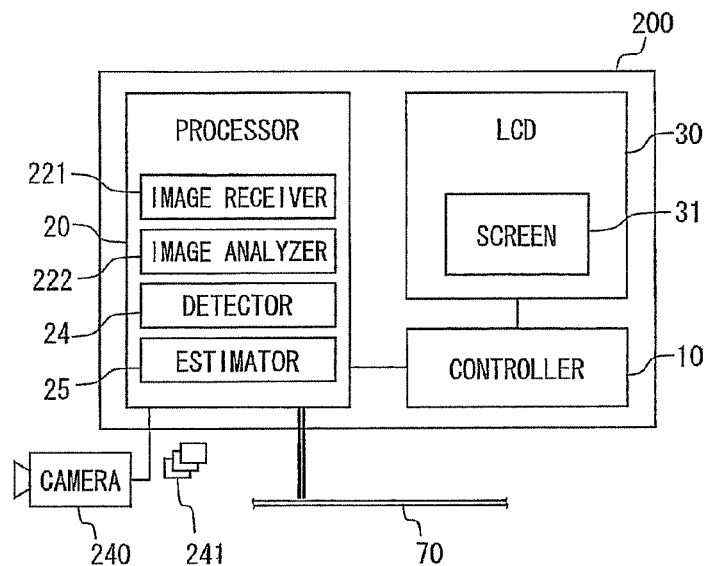
FIG. 8 is a block diagram illustrating a display apparatus according to a second embodiment of the present disclosure.

FIG. 7 is a flow chart of a display process for displaying the series of the opening images 56 on the screen 31. The display process is started by the processor 20 when the processor 20 receives the start signal on the in-vehicle LAN 70.

The display process starts at S101, where the processor 20 outputs the opening image display signal to the controller 10. In response to the opening image display signal, the controller 10 draws the opening images 56 and causes the LCD 30 to display the opening images 56 in sequence.

Then, the display process proceeds to S102, where the processor 20 outputs an information image display signal to the controller 10. Further, at S102, the processor 20 outputs the vehicle information (i.e., the present running speed and the present output power) received through the in-vehicle LAN 70 to the controller 10. In response to the information image display signal, the controller 10 stops drawing the opening images 56 and starts drawing the information image 50, including the meters 54 and 55, corresponding to the received vehicle information and causes the LCD 30 to display the information image 50.

Then, the display process proceeds to S103, where the processor 20 determines whether an ignition of the vehicle is OFF based on whether a stop signal for stopping the engine is on the in-vehicle LAN 70. If the processor 20 determines that the ignition of the vehicle is ON corresponding to NO at S103, the display process repeats S103 so that the controller 10 can continue to draw the information image 50 corresponding to the vehicle information received from the processor 20 through the in vehicle LAN 70. In contrast, if the processor 20 determines that the ignition of the vehicle is OFF corresponding to YES at S103, the display process proceeds to S104.

At S104, the processor 20 outputs an information image stop signal for stopping displaying the information image 50 to the controller 10. After S104, the display process is ended. In response to the information image stop signal, the controller 10 controls the LCD 30 so that the drawing of the information image 50 can be stopped and that no image can be displayed on the screen 31.

Referring back to FIG. 3, in the LCD 30 of the display apparatus 100, the focusing point FP, on which the left eye LE and the right RE are focused, is on the screen 31. In contrast to the focusing point FP, the sensing point PP is not on the screen 31. As a result, when the user views the design 60 displayed on the screen 31, the distance Def from the left eye LE and the right RE to the focusing point FP is different from the distance Dep from the left eye LE and the right RE to the sensing point PP. In this case, the user adjusts the convergence angle $\theta_c$ and causes the focusing point FP to be on the screen 31, thereby viewing the design 60 in three dimensions with the naked eyes. Therefore, for example, immediately after the user's line of sight moves to the screen 31 from the region outside the screen 31, it is difficult for the user to adjust the convergence angle $\theta_c$ due to the difference between the focusing point FP and the sensing point PP. As a result, the user recognizes the left image 51 and the right image 52 as separate images.

To prevent the above disadvantage, according to the first embodiment, the logo 66 having the imaginary distance Dg which gradually increases is displayed as the opening images 56. The logo 66 allows the user's eyes to be acclimated to a three dimensional image displayed away from the screen 31. In such an approach, it is less likely that the user recognizes the left image 51 and the right image 52 as separate images. Thus, it is less likely that the user views double images of each of the digital indicator 61, the marking 62, and the pointer needle 64. Therefore, the display apparatus 100 can allow the user to easily view the digital indicator 61, the marking 62, and the pointer needle 64 in three dimensions.

Further according to the first embodiment, immediately after the user's line of sight moves to the screen 31, the user views the logo 66 in two dimensions. Therefore, it is less likely that the user recognizes the left image 51 and the right image 52 as separate images. The user continuously views a situation where the two dimensional logo 66 displayed on the screen 31 jumps out of the screen 31. Thus, the user's eyes can be surely acclimated to a three dimensional image. Therefore, the display apparatus 100 can allow the user to more easily view the digital indicator 61, the marking, and the pointer needle 64 in three dimensions.

Further, according to the first embodiment, when the detector 24 detects the start signal, the estimator 25 estimates that the user's line of sight moves to the screen 31. In such an approach, the estimator 25 can indirectly and accurately estimate the movement of the user's line of sight to the screen 31. Therefore, the display apparatus 100 can surely allow the user to view a situation where the imaginary distance Dg of the logo 66 gradually increases. In this way, the user's eyes can be surely acclimated to a three dimensional image so that the user can more easily view the digital indicator 61, the marking, and the pointer needle 64 in three dimensions.

Correspondences between terms used in the first embodiment and claims are as follows. The controller 10 corresponds to a controller. The processor 20 corresponds to an estimation section. The LCD 30 corresponds to a display section. The series of opening images 56 corresponds to a series of images. The logo 66 corresponds to a design.

Second Embodiment

A display apparatus 200 according to a second embodiment of the present disclosure is described below with reference to FIGS. 8-14. Differences between the first embodiment and the second embodiment are as follows.

Figure 9:
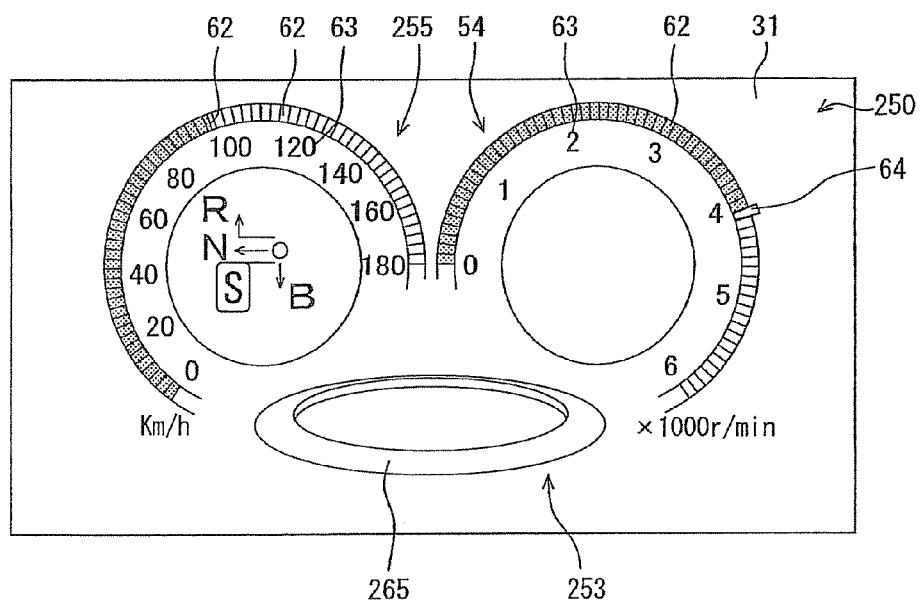
FIG. 9 is a diagram illustrating an information image displayed on a screen of the display apparatus of FIG. 8.

The display apparatus 200 displays an information image 250 on the screen 31. As shown in FIG. 9, the information image 250 includes the speed meter 54, a tachometer 255, and a multi-information display region 253. Each of the speed meter 54 and the tachometer 255 is formed as the combination of designs of the marking 62, the number 63, and the pointer needle 64. The tachometer 255 indicates a rate of rotation of a crankshaft of an engine of the vehicle as the vehicle information. The multi-information display region 253 displays an information icon (not shown) in combination with a circular ring 265. Examples of the information icon can include a warning icon and an arrow icon. The warning icon indicates a warning (e.g., a lack of fuel) related to the vehicle. The arrow icon indicates the heading direction of the vehicle. The ring 265 is inclined with respect to the screen 31 to attract the eyes of the user to the multi-information display region 253. In the multi-information display region 253, the information icon is displayed inside the ring 265. The information image 250 is displayed so that the ring 265, the information icon, the marking 62, and the pointer needle 64 can be recognized as three dimensional designs.

The display apparatus 200 is connected to a camera 240 in addition to the in-vehicle LAN 70. The camera 240 is mounted inside the vehicle in such a manner that a lens of the camera 240 faces the user. The camera 240 captures an image 241 of an area containing the left eye LE and the right eye RE of the user and sequentially outputs image data of the captured image 241 to the processor 20.

The processor 20 includes an interface circuit for allowing the processor 20 to receive the image data from the camera 240 in addition to the interface circuit for allowing the processor 20 to exchange information with the controller 10 and the in-vehicle LAN 70. The processor 20 performs predetermined programs, thereby functioning as an image receiver 221 and an image analyzer 222 in addition to the detector 24 and the estimator 25. The image receiver 221 sequentially receives the image data of the captured image 241 from the camera 240. The image analyzer 222 conducts an analysis of the image data of the captured image 241 received by the image receiver 221 and determines a direction of the user's line of sight based on a result of the analysis.

According to the second embodiment, the detector 24 detects a getting signal out of a lot of information signals on the in-vehicle LAN 70. The getting signal indicates that the user takes action to get into the vehicle. For example, the getting signal can be outputted to the in-vehicle LAN 70, when a door of the driver's seat is opened. When the detector 24 detects the getting signal, the estimator 25 outputs an opening image display signal to the controller 10. In response to the opening image display signal, the controller 10 causes the LCD 30 to display a series of opening images 256, shown in FIG. 10, on the screen 31. Further, when the image analyzer 222 determines that the user's line of sight moves back to the screen 31 after being kept at the region outside the screen 31 for a predetermined period of time (e.g., five minutes), the estimator 25 outputs an acclimation image display signal to the controller 10. In response to the acclimation image display signal, the controller 10 causes the LCD 30 to display a series of acclimation images 257, shown in FIG. 10, on the screen 31.

Figure 10:
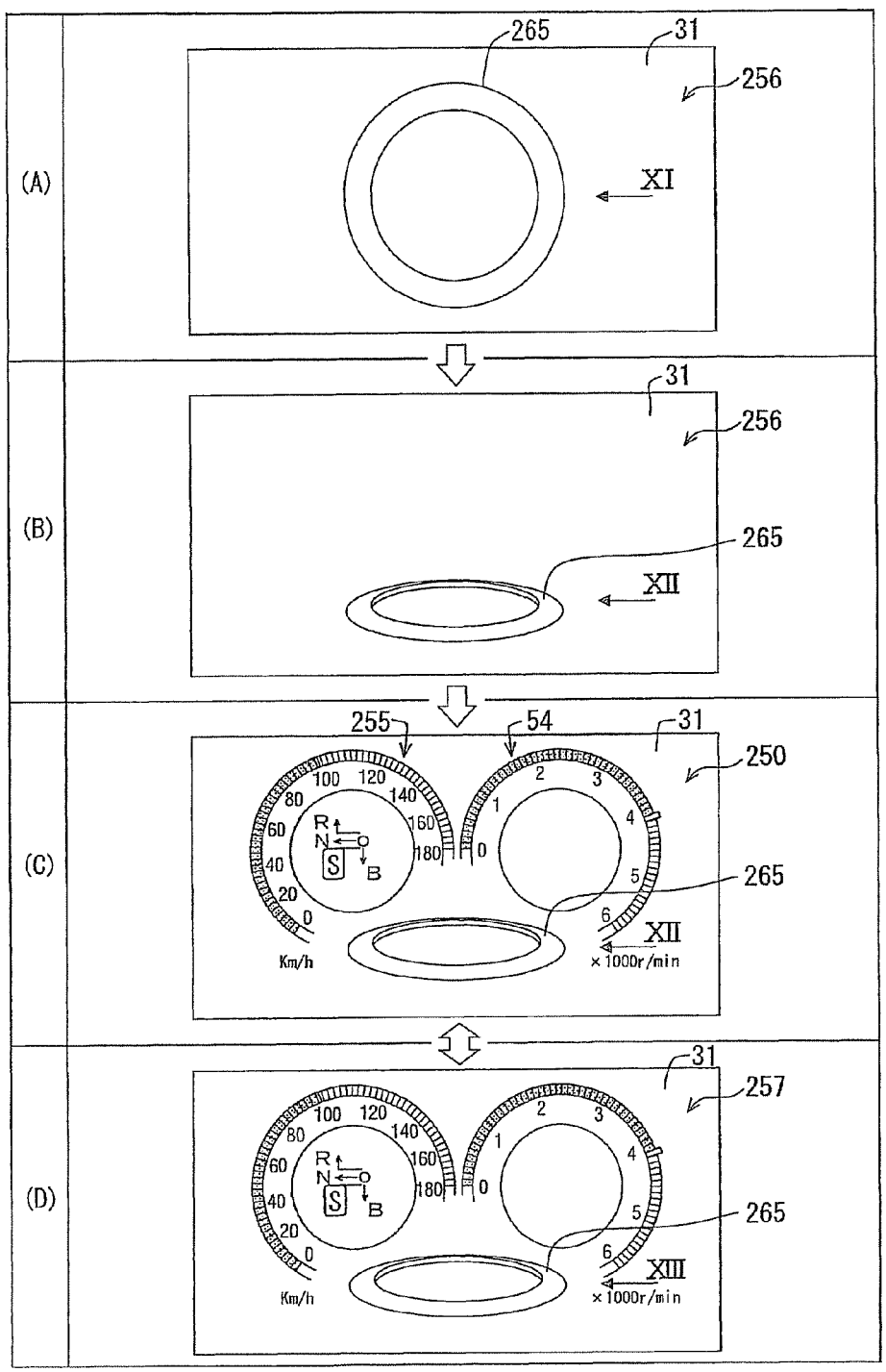
FIG. 10 is a diagram illustrating a change in an image displayed on the screen of the display apparatus of FIG. 8.
Figure 11:
FIG. 11 is a diagram illustrating a view from a direction indicated by an arrow XI in FIG. 10.
Figure 12:
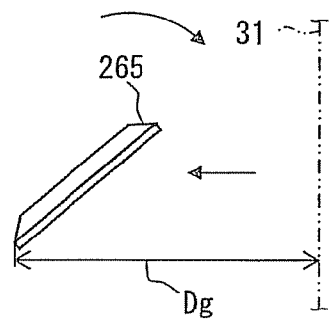
FIG. 12 is a diagram illustrating a view from a direction indicated by an arrow XII in FIG. 10.
Figure 13:
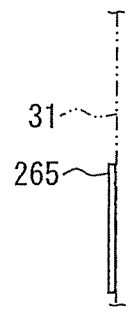
FIG. 13 is a diagram illustrating a view from a direction indicated by an arrow XIII in FIG. 10.

The image displayed on the screen 31 changes with time in an alphabetical order (A), (B), (C), and (D) of FIG. 10. FIG. 11 is a diagram illustrating a view from a direction indicated by ah arrow XI in (A) of FIG. 10. FIG. 12 is a diagram illustrating a view from a direction indicated by an arrow XII in (B) and (C) of FIG. 10. FIG. 13 is a diagram illustrating a view from a direction indicated by an arrow XIII in (D) of FIG. 10.

In the opening image 256 shown in (A) of FIG. 10, the ring 265 is displayed in the center of the screen 31. In (A) of FIG. 10, the ring 265 is displayed as a two dimensional image. Specifically, as shown in FIG. 11, an imaginary distance Dg of the ring 265 with respect to the screen 31 is zero, and an axis of the ring 265 is perpendicular to the screen 31 (i.e., an inclination angle of the ring 265 with respect to the screen 31 is zero). The imaginary distance Dg of the ring 265 gradually changes from zero to a predetermined maximum distance within a predetermined period of time. Further, the inclination angle of the ring 265 gradually changes from zero to a predetermined maximum angle within the predetermined period of time.

In the opening image 256 shown in (B) of FIG. 10 and FIG. 12, the imaginary distance Dg of the ring 265 reaches the maximum distance, and the inclination angle of the ring 265 reaches the maximum angle. The imaginary distance Dg of the ring 265 is kept at the maximum distance for a predetermined period of time, and the inclination angle of the ring 265 is kept at the maximum angle for the predetermined period of time. Then, as shown in (C) of FIG. 10, the screen 31 changes from the opening image 256 to the information image 250 so that the speed meter 54 and the tachometer 255 can appear on the screen 31. The ring 265 remains displayed as a three dimensional image on the screen 31 after the information image 250 is displayed on the screen 31. That is, the ring 265 is included in the information image 250 while the imaginary distance Dg and the inclination angle of the ring 265 are kept at the maximum.

Then, when the movement of the user's line of sight from the region outside the screen 31 back to the screen 31 is detected under a condition that the information image 250 is being displayed on the screen 31, the acclimation image 257, shown in (D) of FIG. 10, appears on the screen 31. In the acclimation image 257 shown in FIG. 13, the imaginary distance Dg of the ring 265 is reset to zero so that the ring 265 can be displayed as a two dimensional image. Then, the imaginary distance Dg of the ring 265 gradually changes from zero to the maximum distance so that the ring 265 can be displayed as a three dimensional image. In this way, the screen 31 switches from the acclimation image 257 shown in (D) of FIG. 10 back to the information image 250 shown in (C) of FIG. 10.

As described above, the series of the opening images 256 shown in (A) and (B) of FIG. 10 is displayed when the user opens the door of the driver's seat in order to get into the vehicle. Generally, the user sits on the driver's seat after the user takes action to open the door of the driver's seat. In this case, there is a high probability that the user's line of sight moves from the region outside the screen 31 to the screen 31. Based on whether the detector 24 detects the getting signal, the estimator 25 indirectly estimates whether the user's line of sight moves to the screen 31 after being kept at the region outside the screen 31 for a predetermined period of time. When the estimator 25 estimates that the user's line of sight is on the screen 31, the estimator 25 outputs the opening image display signal to the controller 10 so that the series of the opening images 256 can be displayed on the screen 31. Thus, it is likely that the user will look at the series of the opening images 256 and continue to view the ring 265 having the imaginary distance Dg which gradually increases.

Further, the series of the acclimation images 257 shown in (D) of FIG. 10 is displayed when the user's line of sight moves back to the screen 31 after being kept at the region outside the screen 31 for the predetermined period of time. Thus, it is likely that the user will look at the series of the acclimation images 257 and continue to view the ring 265 having the imaginary distance Dg which gradually increases.

Figure 14:
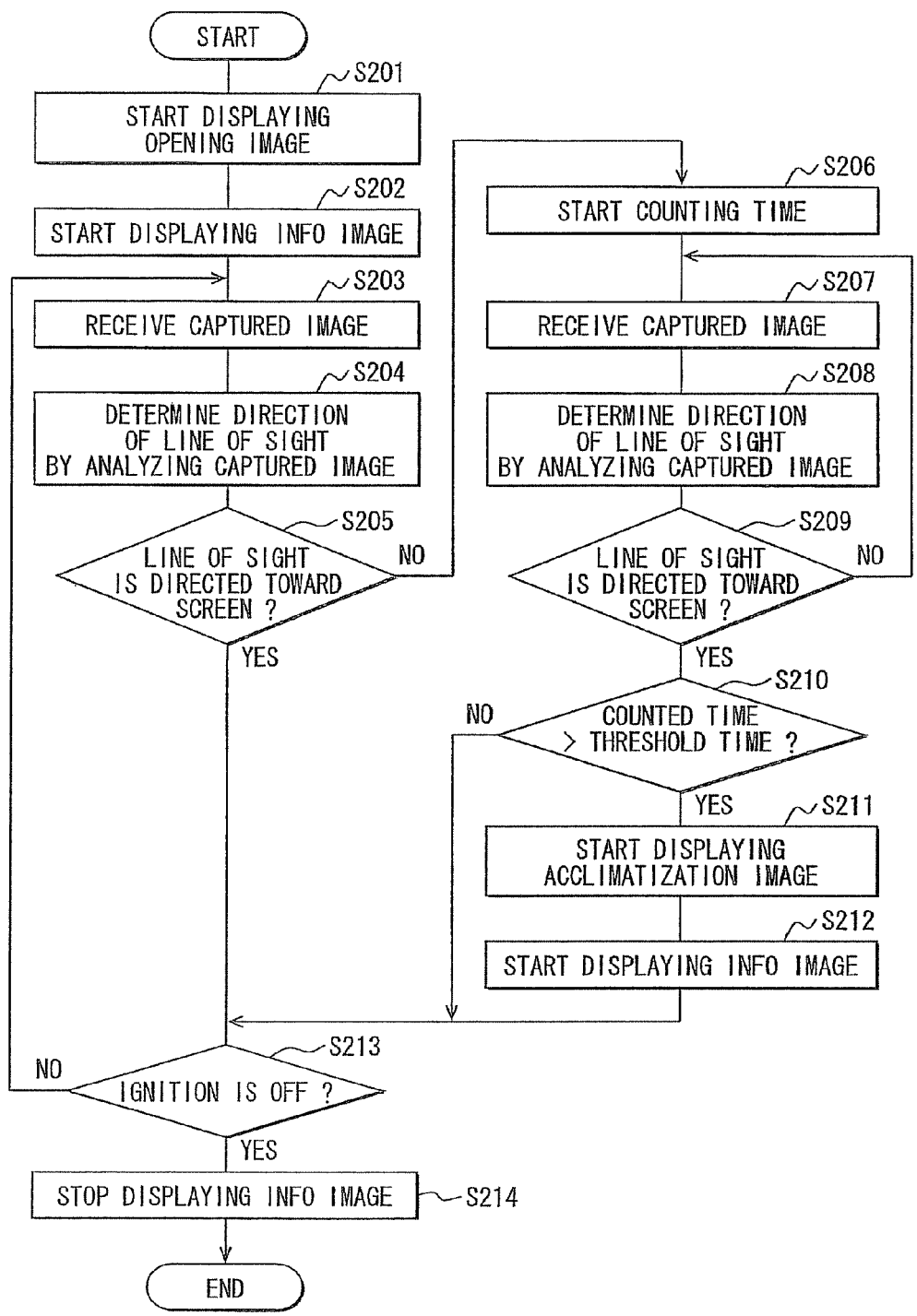
FIG. 14 is a diagram illustrating a flow chart of a display process performed by a processor of the display apparatus of FIG. 8.

FIG. 14 is a flow chart of a display process for displaying the opening images 256, the information images 250, and the acclimation images 257 on the screen 31. The display process shown in FIG. 14 is started by the processor 20 when the processor 20 receives the getting signal on the in-vehicle LAN 70.

Steps S201 and S202 of FIG. 14 are substantially identical to steps S101 and S102 of FIG. 7. Specifically, the display process according to the second embodiment starts at S201, where the processor 20 outputs an opening image display signal to the controller 10. In response to the opening image display signal, the controller 10 draws the opening images 256 and causes the LCD 30 to display the opening images 256 in sequence. Then, the display process proceeds to S202, where the processor 20 outputs an information image display signal for displaying the information images 250 to the controller 10. In response to the information image display signal, the controller 10 stops drawing the opening images 256 and starts drawing the information images 250.

Then, the display process proceeds to S203, where the processor 20 receives the captured image 241. Then, the display process proceeds to S204, where the processor 20 extracts the outlines of the eyes, in particular, the pupils of the eyes of the user from the captured image 241 and determines the direction of the user's line of sight based on the extracted outlines of the pupils.

Then, the display process proceeds to S205, where the processor 20 determines whether the direction of the user's line of sight is directed toward the screen 31 based on the result of the analysis conducted at S204. If the direction of the user's line of sight is directed toward the screen 31 corresponding to YES at S205, the display process proceeds to S213. In contrast, if the direction of the user's line of sight is not directed toward the screen 31 corresponding to NO at S205, the display process proceeds to S206.

At S206, the processor 20 starts counting time during which the direction of the user's line of sight is out of the screen 31. Then, the display process proceeds to S207, where the processor 20 receives the captured image 241. Then, the display process proceeds to S208, where the processor 20 extracts the outlines of the pupils of the eyes of the user from the captured image 241 and determines the direction of the user's line of sight based on the extracted outlines of the pupils. Then, the display process proceeds to S209, where the processor 20 determines whether the direction of the user's line of sight is directed toward the screen 31 based on the result of the analysis conducted at S208. That is, steps S207-S209 are substantially identical to steps S203-S205. If the direction of the user's line of sight is not directed toward the screen 31 corresponding to NO at S209, the display process returns to S207 while continuing to count the time. In contrast, if the direction of the user's line of sight is directed toward the screen 31 corresponding to YES at S209, the display process proceeds to S210.

At S210, the processor 20 determines whether the counted time exceeds a predetermined threshold time, thereby determining whether the time during which the direction of the user's line of sight is out of the screen 31 exceeds the threshold time. If the counted time does not exceed the threshold time corresponding to NO at S210, the display process proceeds to S213. In contrast, if the counted time exceeds the threshold time corresponding to YES at S210, the display process proceeds to S211.

At S211, the processor 20 outputs an acclimation image display signal for starting displaying the acclimation images 257 to the controller 10. In response to the acclimation image display signal, the controller 10 draws the acclimation images 257 and causes the LCD 30 to display the acclimation images 257 in sequence.

Then, the display process proceeds to S212, where the processor 20 outputs an information image display signal for displaying the information images 250 to the controller 10. In response to the information image display signal, the controller 10 stops drawing the acclimation images 257 and starts drawing the information images 250 so that the information images 250 can be displayed on the screen 31.

At S213, the processor 20 determines whether an ignition of the vehicle is OFF based on whether a stop signal for stopping the engine is on the in-vehicle LAN 70. If the processor 20 determines that the ignition of the vehicle is ON corresponding to NO at S213, the display process returns to S203. In contrast, if the processor 20 determines that the ignition of the vehicle is OFF corresponding to YES at S213, the display process proceeds to S214. At S214, the processor 20 outputs an information image stop signal for stopping displaying the information images 250 to the controller 10. After S214, the display process is ended. In response to the information image stop signal, the controller 10 controls the LCD 30 so that the drawing of the information images 250 can be stopped and that no image can be displayed on the screen 31.

As described above, according to the first embodiment, the ring 265 having the imaginary distance Dg which gradually increases is displayed as the opening images 256. The ring 265 allows the user's eyes to be acclimated to a three dimensional image displayed away from the screen 31. In such an approach, it is less likely that the user views double images of each of the marking 62 and the pointer needle 64. Therefore, the display apparatus 200 can allow the user to easily view the marking 62 and the pointer needle 64 in three dimensions.

Further, according to the second embodiment, the ring 265 is included in hot only the opening images 256 but also the information images 250. That is, the ring 265 remains displayed on the screen 31 when the screen 31 switches from the opening image 256 to the information image 250. Thus, the ring 265 can allow the user to smoothly switch from the opening image 256 to the information image 250. In such an approach, the user starts viewing the marking 62 and the pointer needle 64 under a condition where the user is being acclimated to a three dimensional image. Therefore, the display apparatus 200 can allow the user to more easily view the marking 62 and the pointer needle 64 in three dimensions.

Further, according to the second embodiment, when the detector 24 detects the getting signal, the estimator 25 estimates that the user's line of sight moves to the screen 31. In such an approach, the estimator 25 can indirectly and accurately estimate the movement of the user's line of sight to the screen 31. Therefore, the display apparatus 200 can surely allow the user to view a situation where the imaginary distance Dg of the ring 265 gradually increases. In this way, the user's eyes can be surely acclimated to a three dimensional image so that the user can more easily view the marking 62 and the pointer needle 64 in three dimensions.

Further, according to the second embodiment, the direction of the user's line of sight is detected by analyzing the captured image 241. In such an approach, the estimator 25 can directly estimate the movement of the user's line of sight to the screen 31. Therefore, when the user looks at the screen 31 during driving the vehicle, the display apparatus 200 can surely allow the user to view a situation where the imaginary distance Dg of the ring 265 gradually increases. In this way, the user's eyes can be surely acclimated to a three dimensional image so that the user can more easily view the marking 62 and the pointer needle 64 in three dimensions.

Correspondences between terms used in the second embodiment and claims are as follows. The series of opening images 256 and the series of acclimation image 257 correspond to a series of images. The ring 265 corresponds to a design.

Third Embodiment

A third embodiment of the present disclosure is described below with reference to FIGS. 15-17. Differences between the second embodiment and the third embodiment are as follows.

In a series of opening images 356 of the third embodiment, a cross 365 is displayed instead of the ring 265. As shown in (A) of FIG. 15, the cross 365 has a horizontal portion extending in a horizontal direction of the screen 31 and a vertical portion extending in a vertical direction of the screen 31. The vertical portion and the horizontal portion of the cross 365 have a band-like shape and cross each other in the center of the screen 31.

Figure 15:
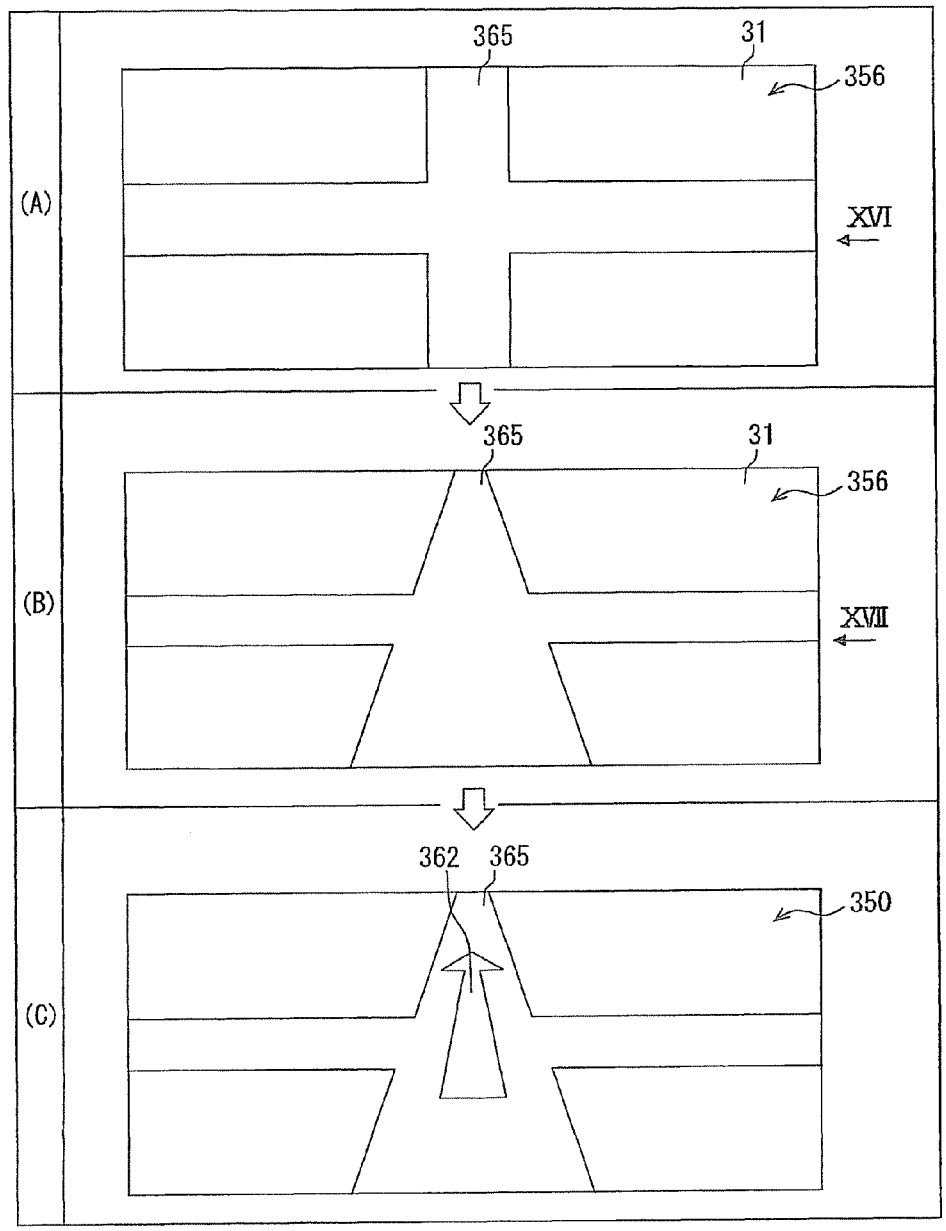
FIG. 15 is a diagram illustrating a change in an image displayed on a screen of a display apparatus according to a third embodiment of the present disclosure.
Figure 16:
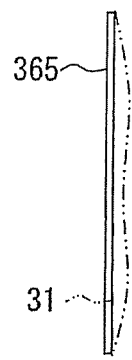
FIG. 16 is a diagram illustrating a view from a direction indicated by an arrow XVI in FIG. 15.

In the opening image 356 shown in (A) of FIG. 15, the cross 365 is displayed as a two dimensional image. Specifically, as shown in FIG. 16, an imaginary distance Dg of the cross 365 with respect to the screen 31 is zero, and an inclination angle of the cross 365 with respect to the screen 31 is zero. The imaginary distance Dg of the cross 365 gradually changes from zero to a predetermined maximum distance within a predetermined period of time. Further, the inclination angle of the cross 365 gradually changes from zero to a predetermined maximum angle within the predetermined period of time.

Figure 17:
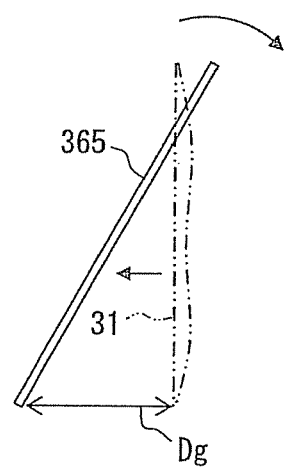
FIG. 17 is a diagram illustrating a view from a direction indicated by an arrow XVII in FIG. 15.

Thus, as shown in (B) of FIG. 15 and FIG. 17, the imaginary distance Dg of the cross 365 reaches the maximum distance, and the inclination angle of the cross 365 reaches the maximum angle. Then, as shown in (C) of FIG. 15, an arrow icon 362 for indicating the heading direction of the vehicle appears on the screen 31 while the cross 365 remains displayed on the screen 31. Thus, the cross 365 and the arrow icon 362 are combined to form a simple navigation image 350 to provide a so-called turn-by-turn navigation. Like the ring 265, the cross 365 allows the user's eyes to be acclimated to a three dimensional image displayed away from the screen 31. Therefore, the same advantages as the second embodiment can be achieved in the third embodiment.

Correspondences between terms used in the third embodiment and claims are as follows. The series of opening images 356 corresponds to a series of images. Each of the cross 365 and the arrow icon 362 corresponds to a design.

Modifications

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

In the embodiments, the imaginary distance of the design in each of the opening image and the acclimation image gradually increases after being reset to zero. Alternatively, the imaginary distance of the design in each of the opening image and the acclimation image can gradually increase after being reduced to a predetermined value that does not give uncomfortable feeling to the user.

In the first embodiment, when the detector 24 detects the start signal for starting the engine of the vehicle, the estimator 25 estimates that the movement of the line of sight of the user to the screen 31 occurs. When the engine is a conventional internal combustion engine, operation of a so-called ignition switch can produce the start signal for staring the engine. However, if the engine is a hybrid engine (i.e., combination of an internal combustion engine and an electric motor), an internal combustion engine with an idle reduction function, or an electric motor, the operation of the ignition switch may not produce the start signal for staring the engine. In this case, a signal, which is produced when operation for stating the engine is performed, can be considered as the start signal.

In the second embodiment, when the detector 24 detects the getting signal for indicating that the door of the driver's seat is opened, the estimator 25 estimates that the movement of the line of sight of the user to the screen 31 occurs. The getting signal can be produced when the user takes another action to get into the vehicle. For example, the getting signal can be produced when the user wears a seatbelt of the driver's seat or when the user sits on the driver's seat.

In the embodiments, the design in the opening image or the acclimation image for allowing the user to be acclimated to a three dimensional image is not limited to a logo, a ring, or a cross. The shape and color of the design can be modified as needed. For example, the design can be a modeled outer shape of the vehicle.

In the embodiments, the imaginary distance of the design changes from zero to the maximum value within two seconds. The period of time within which the imaginary distance changes from zero to the maximum value can be modified as needed, for example, according to animation played as the opening image or the acclimation image.

Multiple types of moving images used as the opening image or the acclimation image can be prestored in the controller. In this case, the user can select a moving image played as the opening image or the acclimation image from the prestored moving images. An input device, such as a replay button, for allowing the user to display the opening image or the acclimation image on the screen can be provided in the display apparatus.

In the embodiments, the imaginary distance of the design such as the logo in the opening image increases so that the user can feel that the design moves with acceleration toward the user. The movement of the design due to the increase in the imaginary distance can be modified as needed. For example, the imaginary distance of the design can increase so that the user can feel that the design moves at a constant speed toward the user, or so that the user can feel that the design moves stepwise toward the user while blinking.

In the embodiments, the imaginary distance of the design is measured from the screen in a direction toward the user so that the user can feel that the design moves toward the user. Alternatively, the imaginary distance of the design can be measured from the screen in a direction away from the user so that so that the user can feel that the design moves away from the user. The opening image or the acclimation image can include at least two designs. In this case, the opening image or the acclimation image can be displayed so that the user can feel that one design moves toward the user and that the other design moves away from the user.

In the second embodiment, the camera can be a visible camera sensitive to visible light or a near-infrared camera sensitive to near-infrared light.

In the second embodiment, the processor outputs the acclimation image display signal to the controller based on the direction of the user's line of sight determined by the analysis of the captured image. Instead of, or in addition to, the acclimation image display signal, the processor can output the opening image display signal to the controller based on the direction of the user's line of sight determined by the analysis of the captured image.

In the second embodiment, when the driver's line of sight moves back to the screen 31 after being kept at the region outside the screen 31 for five minutes, the processor outputs the acclimation image display signal to the controller. That is, the threshold time in S210 of FIG. 14 is set to five minutes. The threshold time can be modified as needed. For example, the user can change the threshold time by inputting a desired time through an input device.

In the embodiments, the information image is displayed on the screen after the opening image and the acclimation image are displayed. However, in a case where the user drives the vehicle immediately after starting the engine, it is preferable that the screen should switch from the opening image to the information image as soon as possible. To this end, for example, the processor can switch the screen from the opening image to the information image immediately after detecting a shift position signal indicating that a shift lever of the vehicle is shifted in a drive position or a vehicle speed signal indicating that a speed of the vehicle exceeds zero.

In the embodiments, the LCD 30, as a display section for allowing the user to view the design in three dimensions, is a combination of the liquid crystal panel 35 and the lenticular lens 33. The display section is not limited to the combination of the liquid crystal panel 35 and the lenticular lens 33, as long as the display section can allow the user to view a design in an image in three dimensions. For example, the display section can allow the user to view the design in three dimensions only when the user views the image from one direction. For another example, the display section can allow the user to view the design in three dimensions even when the user views the image from two or more directions. Alternatively, the display section can be a combination of active shutter glasses and a LCD that alternately displays right and left images in synchronization with shutters of the glasses. Alternatively, the display section can be a so-called parallax barrier type display for allowing the user to view the design in three dimensions with the naked eyes. The parallax barrier type display includes a light-shielding barrier instead of the lenticular lens 33. The light-shielding barrier has slits that extends in the vertical direction and are arranged at intervals in the horizontal direction.

In the embodiments, the controller 10 and the processor 20 perform programs, thereby functioning as a controller and an estimation section. Alternatively, the controller and the estimation section can be a single circuit or device. Alternatively, the controller and the estimation section can be a combination of circuits or devices.

What is claimed is:

1. A display apparatus adapted to be mounted on a vehicle and configured to display a series of images related to the vehicle in such a manner that a user views a design in the series of images in three dimensions, each of the series of images being formed as a combination of a left image visible by a left eye of the user and a right image visible by a right eye of the user, the display apparatus comprising:
    a display section having a screen and configured to display the left image and the right image on the screen so that the user views the design at a position away from the screen by a predetermined imaginary distance in a direction perpendicular to the screen;
    an estimation section configured to estimate whether a movement of a line of sight of the user to the screen from a region outside the screen occurs; and
    a controller configured to gradually increase the imaginary distance when the estimation section estimates that the movement occurs, wherein
    the display section displays an information image indicative of information related to the vehicle after displaying the series of images, and
    the design overlays on the information image in such a manner that the increased imaginary distance is kept.

2. The display apparatus according to claim 1, wherein the controller gradually increases the imaginary distance from zero.

3. The display apparatus according to claim 1, wherein the estimation section includes a detector and an estimator, the detector detects a start signal for starting an engine of the vehicle, and
    the estimator estimates that the movement occurs, when the detector detects the start signal.

4. The display apparatus according to claim 1, wherein
the estimation section includes a detector and an estimator,
the detector detects a getting signal for indicating that the user takes action to get into the vehicle, and
the estimator estimates that the movement occurs, when the detector detects the getting signal.

5. The display apparatus according to claim 1, wherein
the estimation section includes an image receiver, an image analyzer, and an estimator,
the image receiver receives a captured image, the captured image being produced by capturing an area containing the eyes of the user,
the image analyzer conducts analysis of the captured image to determine a direction of the line of sight of the user, and
the estimator estimates that the movement occurs, when a result of the analysis indicates that the line of sight of the user moves to the screen after being kept at the region outside the screen for a predetermined period of time.

6. A display apparatus adapted to be mounted on a vehicle and configured to display a series of images related to the vehicle in such a manner that a user views a design in the series of images in three dimensions, each of the series of images being formed as a combination of a left image visible by a left eye of the user and a right image visible by a right eye of the user, the display apparatus comprising:
a display section having a screen and configured to display the series of images on the screen so that the user views the design at a position away from the screen by a predetermined imaginary distance in a direction perpendicular to the screen;
an estimation section including a detector which detects a signal indicating that the vehicle will start to run, the estimation section configured to estimate whether a movement of a line of sight of the user to the screen from a region outside the screen occurs after the line of sight of the user is kept at the region outside the screen for a predetermined period of time; and
a controller configured to perform a control process for causing the display section to display the series of images in such a manner that the imaginary distance gradually increases, wherein
the controller starts to perform the control process when the detector detects the signal and repeats the control process each time the estimation section estimates that the movement occurs.

7. The display apparatus according to claim 6, wherein the imaginary distance gradually increases from zero.

8. The display apparatus according to claim 6, wherein
the display section displays an information image indicative of information related to the vehicle after displaying the series of images, and
the design overlays on the information image in such a manner that the increased imaginary distance is kept.

9. The display apparatus according to claim 6, wherein
the signal is a start signal indicating that the user takes action to start an engine of the vehicle.

10. The display apparatus according to claim 6, wherein
the signal is a getting signal indicating that the user takes action to get into the vehicle.

11. The display apparatus according to claim 6, wherein
the estimation section further includes an image receiver, an image analyzer, and an estimator,
the image receiver receives a captured image, the captured image being produced by capturing an area containing the eyes of the user,
the image analyzer conducts analysis of the captured image to determine a direction of the line of sight of the user, and
the estimator estimates that the movement occurs, when a result of the analysis indicates that the line of sight of the user moves to the screen after being kept at the region outside the screen for the predetermined period of time.

12. The display apparatus according to claim 6, wherein
the display section displays an information image indicative of information related to the vehicle, and
the imaginary distance gradually increases with the information image displayed on the screen.

* * * * *